United States Patent
Yagisawa et al.

(10) Patent No.: US 7,181,570 B2
(45) Date of Patent: Feb. 20, 2007

(54) DISKARRAY SYSTEM FOR SUPPRESSING DISK FAULT

(75) Inventors: Ikuya Yagisawa, Tokyo (JP); Takuji Ogawa, Odawara (JP); Kenichi Takamoto, Odawara (JP); Yoshinori Tsuneda, Odawara (JP); Azuma Kano, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/924,813

(22) Filed: Aug. 25, 2004

(65) Prior Publication Data

US 2005/0268034 A1  Dec. 1, 2005

(30) Foreign Application Priority Data

May 25, 2004  (JP) ............................ 2004-154077

(51) Int. Cl.
*G06F 12/16* (2006.01)

(52) U.S. Cl. .................................... 711/114

(58) Field of Classification Search ........... 711/114, 711/162; 714/5, 6, 7, 30; 360/75
See application file for complete search history.

(56) References Cited

U.S. PATENT DOCUMENTS

| | | | |
|---|---|---|---|
| 5,148,432 A * | 9/1992 | Gordon et al. ................. 714/7 |
| 5,321,826 A * | 6/1994 | Ushiro ......................... 711/162 |
| 5,537,566 A * | 7/1996 | Konno et al. ................ 711/114 |
| 5,611,069 A * | 3/1997 | Matoba ........................ 711/114 |
| 5,615,335 A * | 3/1997 | Onffroy et al. ............... 714/30 |
| 5,644,697 A * | 7/1997 | Matsumoto et al. .......... 714/6 |
| 5,801,894 A | 9/1998 | Boutaghou et al. |
| 5,859,738 A | 1/1999 | Forehand et al. |
| 5,872,670 A | 2/1999 | Ataee |
| 5,958,066 A * | 9/1999 | Kedem .......................... 714/5 |
| 6,134,069 A * | 10/2000 | Catalano et al. .............. 360/75 |

(Continued)

FOREIGN PATENT DOCUMENTS

EP  0 660 306 A1  6/1995

(Continued)

OTHER PUBLICATIONS

Kunz, R. "Paritaetischer Plattenverband. Datensicherheit Durch Raid-Systeme" Elektronik, Franzis Verlad GMBH, Munchen, DE, vol. 45, No. 11, May 28, 1996, pp. 94-96,99. [XP-000593879].

(Continued)

*Primary Examiner*—Pierre Bataille
*Assistant Examiner*—Paul Schlie
(74) *Attorney, Agent, or Firm*—Antonelli, Terry, Stout and Kraus, LLP.

(57) ABSTRACT

A diskarray system has a diskarray controller and a plurality of disk devices. Each of the disk devices has a media, a head, and a head position controller. The diskarray controller performs online data check operation, and stops the online data check operation over the disk device at first predetermined timing. After stopping the online data check operation, the diskarray controller issues an unload enable command to the disk device so as to move the head to a position different from positions at which the head reads or writes data from or to the media. The head position controller of the disk device moves the position of the head on the basis of the received unload enable command.

9 Claims, 5 Drawing Sheets

U.S. PATENT DOCUMENTS

| | | | |
|---|---|---|---|
| 6,476,996 | B1 | 11/2002 | Ryan |
| 6,480,970 | B1 * | 11/2002 | DeKoning et al. ............. 714/6 |
| 6,639,750 | B1 * | 10/2003 | Hirano et al. ................. 360/75 |
| 2001/0026416 | A1 * | 10/2001 | Teshigawara ................ 360/75 |
| 2002/0162048 | A1 * | 10/2002 | Ackaret et al. ................ 714/6 |

FOREIGN PATENT DOCUMENTS

JP     A-2002-297320     10/2002

OTHER PUBLICATIONS

Gasior, Geoff. IBM Drives Don't Work Overtime, Internet Article, 'Online! Mar. 8, 2002, Retrieved from the Internet: URL: http://techreport.com/onearticle.x/3465> retrieved on Feb. 24, 2005. [XP-002319239].

Anonymous. "Hitachi 80GB Notebook Drive Tests," Internet Article, 'Online! May 13, 2003, Retrieved from the Internet: URL://http://www.xlr8yourmac.com/IDS/hitachi_travelstar80GB/hitachi_travelstar80GB.html. retrieved on Feb. 24, 2002. [XP002319240].

Wasson, S., "IBM's Hard Drive Debacle Grows," Internet Article, 'Online! Mar. 19, 2002, retrieved from the Internet: URL:/http://techreport.com/onearticle.x/3494> [XP002319241]; pp. 1-8.

Anonymous. "Fibre Channel RAID Subsystem Mastera L Series 2Gbit", Internet Article, 'Online! Oct. 27, 2003, Retrieved from internet: URL:http://www.newnet.fr/docs/stockage/Mastera%20/MasteraLSERIES.pdf>, 2 pgs. [XP002319242].

Kozierok, Charles M., "The PC Guide," Internet Article, 'Online! Dec. 12, 2003, Retrieved from the Internet: URL:http://web.archive.org/web/20031212162423/http://www.storagereview.com/guide2000/ref/hdd/perf/qual/featuresHead.html> [XP002319243].

Patterson, David A. , et al—"*A Case for Redundant Arrays of Inexpensive Disks (RAID)*," ACM SIGMOD Conference Proceeding, Jun. 1988, pp. 109-116. USA.

\* cited by examiner

| DISK No. | CUMULATIVE OPERATING TIME | CUMULATIVE UNLOAD TIME | DIFFERENTIAL OPERATING TIME | DIFFERENTIAL UNLOAD TIME | CUMULATIVE OPERATING TIME THRESHOLD | CUMULATIVE NON-UNLOAD RATE THRESHOLD | DIFFERENTIAL NON-UNLOAD RATE THRESHOLD |
|---|---|---|---|---|---|---|---|
| 0 | 20001 hr | 7000 hr | 1000 | 700 | 20000 hr | 60 % | 80 % |
| 1 | 10000 hr | 3999 hr | 1000 | 700 | 20000 hr | 60 % | 80 % |
| 2 | 10000 hr | 7000 hr | 1000 | 199 | 20000 hr | 60 % | 80 % |
| 3 | 10000 hr | 7000 hr | 1000 | 700 | 20000 hr | 60 % | 80 % |
| ... | | | | | | | |

FIG.4

DISKARRAY SYSTEM FOR SUPPRESSING DISK FAULT

INCORPORATION BY REFERENCE

The present application claims priority from Japanese application JP2004-154077 filed on May 25, 2004, the content of which is hereby incorporated by reference into this application.

BACKGROUND OF THE INVENTION

The present invention relates to a storage system for storing data to be accessed by a computer and more particular, to a diskarray system having a plurality of disk drives or devices.

As one of types of storage systems to be connected to a computer, there is a diskarray system. The diskarray system is also referred to as a RAID (Redundant Arrays of Inexpensive Disks) system, which is a storage system having a plurality of disk devices arranged in an array and a controller (diskarray controller) for controlling the devices. In the diskarray system, a read request (data read request) and a write request (data write request) are processed at high speed through the parallel operation of the disk, and a redundancy is added to the data. Such diskarray systems are classified into 5 levels according to the type of added redundant data and its structure, as disclosed in D. Patterson et al, "A Case for Redundant Arrays of Inexpensive Disks (RAID)", ACM SIGMOD Conference Proceeding, June 1988, pp. 109–116.

Meanwhile, there is disclosed a technique (refer to JP-A-2002-297320) for reducing a power consumption by shifting a diskarray system to an energy saving mode to suppress power supply to a specific disk.

SUMMARY OF THE INVENTION

Among disk devices to be applied to the diskarray system, there is a disk device which has a short operating time (life) and cannot be operated continuously for 24 hours. Such disk devices include, for example, a low-cost ATA (AT Attachment) disk which is designed for a personal computer. The ATA disk is manufactured, in many cases, assuming that its operating requirement is about 10 hours per day. Meanwhile, the diskarray system is assumed to be operated, in many cases, under its operating requirement of continuous 24 hours and 365 days operation. Thus, when such an ATA disk is used in the diskarray system, there occurs a problem that the operating time of the ATA disk per unit time is increased and a failure rate of the disk device is correspondingly increased. To avoid this, a technique for suppressing the reduction of the reliability of the disk device used in the diskarray system or increasing the reliability of the disk device is required.

To resolve the above problem, there is disclosed a diskarray system which follows. More specifically, the diskarray system includes a diskarray controller and a plurality of disk devices for storing data. Each of the disk devices has a media on which data is to be recorded, a head for reading and writing data from and to the media, and a head position controller for controlling the position of the head. The diskarray controller performs online data check to check whether or not a failure is present in a storage area of the disk device by reading data from the storage area. That is, the diskarray controller stops the online data check operation for the disk device, and issues an unload validation (enable) command to the disk device after the stoppage of the online data check operation in such a manner that the head of the disk device is moved to one position different from another position at which the head reads or writes data from or to the media. The head position controller of the disk device functions to move the head position under control of the received unload enable command.

Consequently, the reliability of the disk device used in the diskarray system can be increased.

Other objects, features and advantages of the invention will become apparent from the following description of the embodiments of the invention taken in conjunction with the accompanying drawings.

DETAILED DESCRIPTION OF THE EMBODIMENTS

An embodiment of the present invention will be explained with reference to the accompanying drawings. The embodiment to be explained below is given as an example of the present invention, and the present invention is not limited by the embodiment.

(1) Exemplary Configuration of Computer System

An exemplary configuration of a computer system in accordance with the present embodiment will be explained by referring to FIG. 1.

Figure 1:
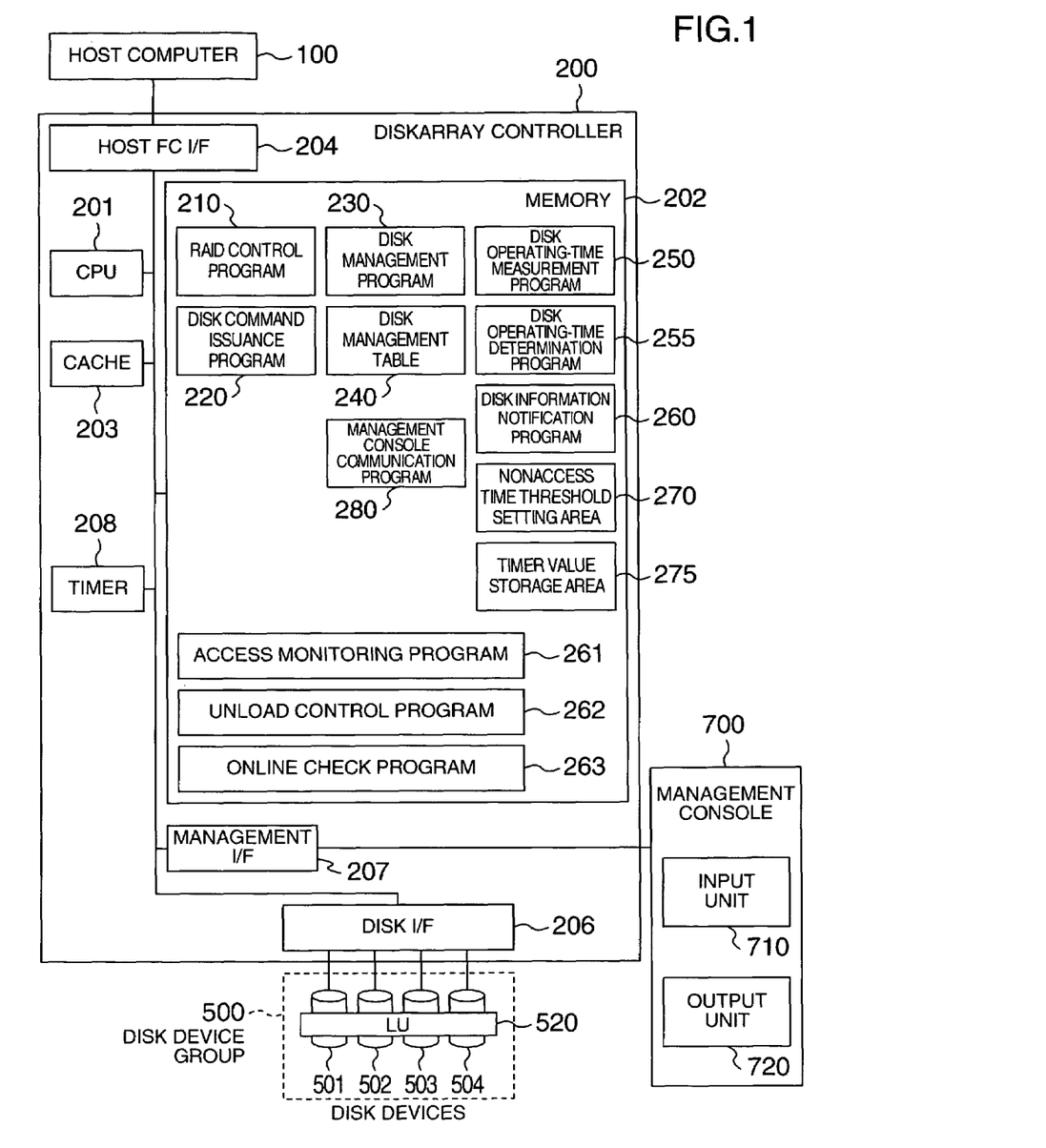
FIG. 1 shows an exemplary configuration of a computer system in accordance with an embodiment of the present invention.

In FIG. 1, reference numeral 100 denotes a host computer, numeral 200 denotes a diskarray controller, 500 denotes a disk device group, and 700 denotes a management console. The diskarray controller 200 is connected to the disk device group 500, and the diskarray controller 200 and the disk device group 500 form a diskarray system. The host computer 100 and the management console 700 are connected to the diskarray controller 200.

The disk device group 500 is made of a plurality of disk devices 501 to 504. In the diskarray system, a plurality of pieces of data stored in the different disk devices form a parity group of the RAID. Part of the data of the parity group is data to be accessed by the host computer 100, while the other data is parity data to be generated from the data to be accessed by the host computer 100. The parity data is redundant data which is used to restore data stored in the storage area of a disk device when a fault took place in the storage area of the disk device. The parity data is generated, for example, by computing an exclusive-or operation on the other data forming the same parity group. The disk devices 501 to 504 form an LU 520 as a logical volume.

The diskarray controller 200 has a CPU 201 for controlling the diskarray system, a memory 202 for storing therein a program or information to be executed by the CPU 201, a cache 203 for temporarily storing data to be accessed by the host computer 100, a host FC I/F 204 for transmitting and receiving data to and from the host computer, a disk I/F 206 for transmitting and receiving data to and from the disk device group 500, a management I/F 207 for transmitting and receiving control information to and from the management console 700, and a timer 208. These constituent elements of the diskarray controller are connected to each other by internal communication lines to communicate with each other.

The memory 202 has programs, information and information storage areas which follow.

(a) A RAID control program 210 for controlling the diskarray system.
(b) A disk command issuance program 220 for issuing a command to the disk device group 500.
(c) A disk management program 230 for managing the disk device group 500.
(d) A disk management table 240 for recording information of each of the disk devices included in the disk device group 500.
(e) A disk operating-time measurement program 250 for measuring the operating time of the disk device.
(f) A disk operating-time determination program 255 for deciding the operating time of the disk device according to a predetermined criterion.
(g) A disk information notification program 260 for informing the management console 700 of information relating to the disk device.
(h) A nonaccess-time threshold setting area 270 which is used to decide whether or not to issue an unload command to the disk device and which stores the threshold of the non-access time.
(i) A timer value storage area 275 for storing a time during which no access is made to the disk device based on a command from the host computer 100.
(j) A management console communication program 280 for communicating with the management console 700.
(k) An access monitoring program 261 for monitoring the presence or absence of an access to the disk device.
(l) An unload control program 262 for instructing the disk device to enable or disable the unloading of the disk device.
(m) An online check program 263 for performing online data check to check whether or not data can be read from the disk device.

The online data check to be executed by the online check program 263 includes, for example, two types of methods. That is, the first method is called 'verify', which checks whether or not data can be read from the disk device. The second method is called 'parity check' in which a plurality of pieces of data forming a parity group are read from a plurality of disk devices to checks whether or not the parity data have a relation of data consistency therebetween as the parity group of the RAID (for example, the parity data forms an exclusive-or on the other data belonging to the same parity group).

The online data check is executed under control of the diskarray controller while the diskarray controller 200 executes an access request issued from the host computer 100 to the diskarray system. More specifically, data is read from the storage area of the disk device under control of the online check program 263 regardless of an access from the host computer 100. In the aforementioned first method, the system is judged as normal when the data reading is successful, while the system is judged as an error when the data reading ends in a failure. In the aforementioned second method, the contents of the read data is further checked by the online check program 263 so that the system is judged as normal when the data has a consistency as the data of the parity group, whereas the system is judged as an error when the data has no consistency thereas. When an error is detected through the online data check, the diskarray controller 200 restores the data so far stored in the storage area where the error was detected, from data belonging to the same parity group as the so-far-stored data; and stores the restored data in another storage area of the disk device.

The unloading operation will be explained later.

The management console 700 has an input unit 710 for accepting set information to be set in the diskarray controller 200 from a user or a maintenance man and an output unit 720 for outputting information acquired from the diskarray controller 200. The input unit 710 is a keyboard, a mouse or the like; and the output unit 720 is a display or the like.

Figure 2:
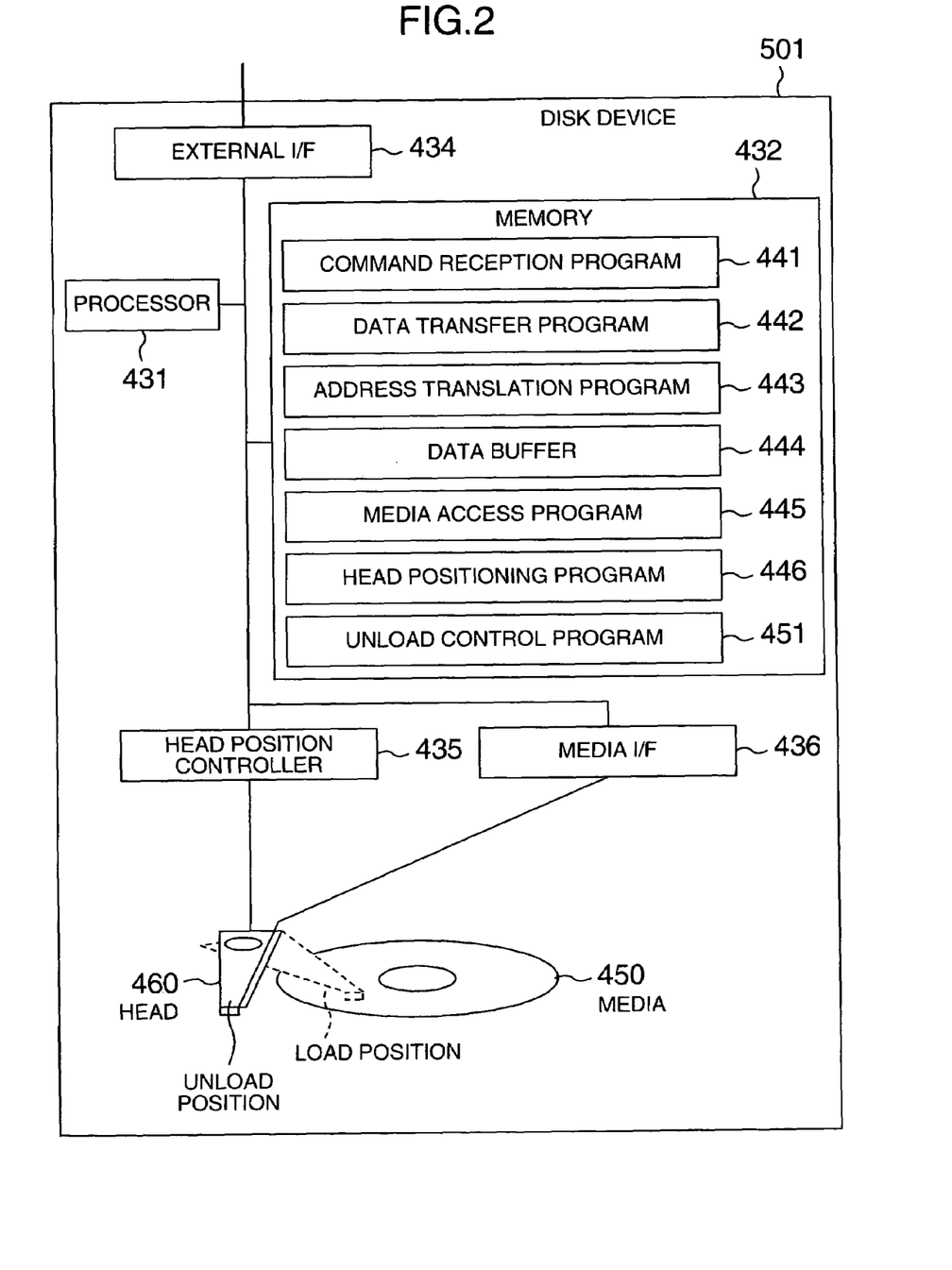
FIG. 2 shows an exemplary structure of a disk device.

FIG. 2 shows an exemplary structure of a disk device 501. The disk devices 502 to 504 have a structure similar to the disk device 501.

Reference numeral 450 denotes a media to be rotated by a rotary mechanism for storing data therein, and numeral 460 denotes a head for writing or reading data to or from the media 450. The rotary mechanism of the media 450 is not illustrated.

Numeral 434 denotes an external I/F, which forms an interface with an external device and in the present embodiment, is connected to the disk I/F 206 of the diskarray controller 200. Numeral 431 is a processor for controlling the disk device 501, 432 denotes a memory for storing therein programs and data to be executed by the processor 431, 435 denotes a head position controller for controlling the position of the head 460, and 436 denotes a media I/F as an interface for writing or reading data to or from the media 450 via the head 460.

The memory 432 has programs and storage areas which follow.

(a) A command reception program 441 for receiving a command from the diskarray controller 200 via the external I/F 434.
(b) A data transfer program 442 for executing data transfer within the disk device 501.
(c) An address translation program 443 for translating an address specified by the command received from the diskarray controller 200 into an address indicative of an actual position on the media 450.
(d) A data buffer 444 for buffering data.
(e) A media access program 445 for controlling access to the media 450.
(f) A head positioning program 446 for determining the position of the head 460.
(g) An unload control program 451 for controlling loading or unloading of the head 460.

Explanation will now be made as to the unloading. In the disk device of a load/unload type, the head 460 can be retracted to an unload position away from the media 450. Since the unload position is away from the media, the head cannot read or write data from or to the media and head will not be brought into contact with the media. Accordingly, when the head 460 is retracted to the unload position, the contact between the head 460 and the media 450 can be avoided and the failure rate of the disk device can be reduced. In this connection, when the head 460 is at the unload position, the head 460 is usually supported by a head support (not shown). In the present embodiment, however, it may be assumed that the head is at the unload position, so long as the media 450 is not present under the head and the head is located in such a condition as to able to avoid any contact between the head 460 and the media 450, including the above condition that the head is supported by the support.

Even when the head 460 is retracted to the unload position, the media 450 itself can continue its rotation. Thus, when there is an access to the disk device, the head 460 can be moved in a time much shorter than when the rotation of the media 450 is stopped to a load position, that is, where the head can read or write data from or to the media 450. When there is an access from the host computer 100 to data recorded on the media 450 during stoppage of the rotation of the media, it takes a time for the media to resume its rotation. Therefore, the access time is prolonged by a time after issuance of an access command from the host computer 100 until the diskarray system responds to the command, and the response of the diskarray system to the host computer 100 may time out. Even when the head is retracted to the unload position, the sustained rotation of the media 450 allows the head to be returned to a load position in a short time to access data recorded on the media 450. Thus this can solve such a problem that the response of the diskarray system times out.

Figure 3:
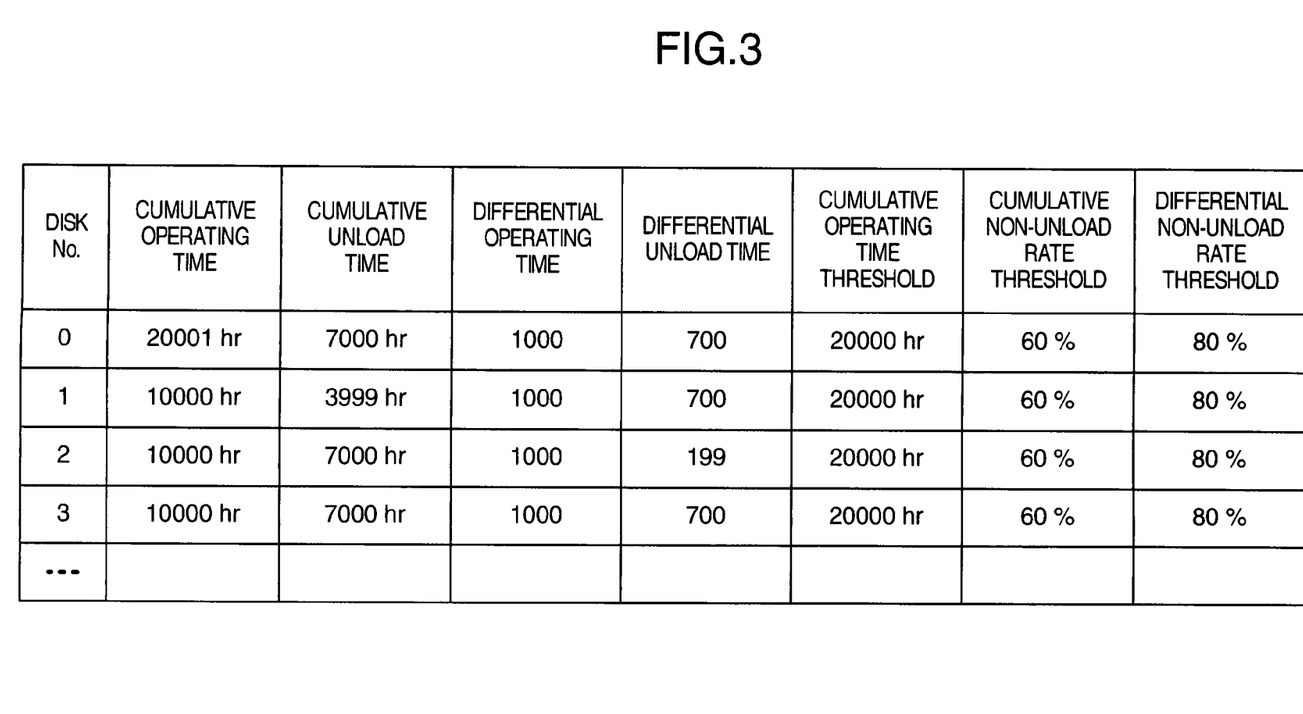
FIG. 3 shown an example of a disk management table.

FIG. 3 shows an example of the disk management table 240.

Parameters stored in the disk management table 240 are "disk no." indicative of the identification number of a disk device, "cumulative operating time" indicative of a cumulative operating time of the disk device, "cumulative unload time" indicative of a cumulative unload time of the disk device, "differential operating time" indicative of an operating time of the disk device within a specific period, "differential unload time" indicative of an unload time within the specific period, "cumulative operating time threshold" indicative of a threshold of the cumulative operating time, "cumulative non-unload rate threshold" indicative of a threshold of a cumulative non-unload rate as a ratio of the cumulative not-loaded time, i.e., the cumulative load-condition time, and "differential non-unload rate threshold" indicative of a threshold of a differential non-unload rate as a ratio of a not-loaded time, i.e., a load-condition time within the specific period.

In this case, the cumulative non-unload rate is defined by a percentage of ((1-'cumulative unload time')/'cumulative operating time'). The differential non-unload rate is defined by a percentage of ((1-'differential unload time')/'differential operating time'). For the 'cumulative operating time threshold', a value indicative of the product life of the disk as its operating time or indicative of the disk reaching its life expectancy as a rule of thumb, is set.

Using the input unit 710 of the management console 700, the user or maintenance man enters 'cumulative operating time threshold', 'cumulative non-unload rate threshold', 'differential non-unload rate threshold', and 'non-access time threshold'. The management console 700 transmits information accepted from the input unit via the management I/F 207 to the management console communication program 280 of the diskarray controller 200, and program 280 in turn sets the received information in the disk management table 240 or in the nonaccess-time threshold setting area 270.

(2) Unload Function of Disk Device

Explanation will be made as to the unload function of the disk devices 501 to 504, by referring to FIG. 2. Since the disk devices 501 to 504 have the same structure, explanation will be made in connection with the disk device 501 as a representative thereof.

An unload enable command or an unload disable command issued by the unload control program 262 of the diskarray controller 200 is received by the command reception program 441 via the external I/F 434, and the command reception program 441 in turn decides the type of the received command.

When the command reception program 441 determines that the received command is the unload enable command, the unload control program 451 instructs the head position control 435 to move the head 460 to the unload position. When the command reception program 441 determines that the received command is the unload disable command, on the other hand, the unload control program 451 instructs the head position controller 435 to move the head 460 to the load position.

In this connection, when the received command is the unload enable command, the unload control program 451 immediately issues an unload instruction to the head position controller 435, but after passage of a constant time, the unload control program 451 may issue an instruction to the head position controller 435 to move the head 460 to the unload position. Further, when the received command is the unload disable command, the unload control program 451 immediately issues an instruction to the head position controller 435, but at the timing that the command reception program 441 receives an I/O type command such as a read request or a write request from the diskarray controller 200, the unload control program 451 may issue an instruction to the head position controller 435 to move the head 460 to the load position.

(3) Unload Supporting Operation of Diskarray Controller

The diskarray controller 200, in response to an access request from the host computer 100, accesses the disk devices 501 to 504. The diskarray controller 200 executes the access to the disk devices and online data check when an access request is frequently issued from the host computer 100. When the access request is not issued from the host computer 100, the diskarray controller 200 suppresses the online data check and puts the head of the disk device in the unload state, thus enabling reduction of the failure rate of the disk device.

An example of a processing flow of unload supporting operations to be executed by the diskarray controller 200 will be explained in connection with an example of control over the disk device 501 by referring to a flowchart of FIG. 4.

First of all, the unload control program 262 issues an unload disable command to the disk device 501 to put the head 460 of the disk device 501 in the load state (step 1001). The disk management program 230 then starts the online data check of the disk device 501 using the online check program 263 (step 1002).

And the access monitoring program 261 monitors the timer 208 to start the measurement of a time during which no access from the host computer 100 to data stored in the disk device 501 is present (step 1003).

The access monitoring program 261 monitors whether or not an access command to the disk device was issued from the disk command issuance program 220 to the disk I/F 206, that is, whether or not an access to the disk device 501 based on a request from the host computer 100 was present (step 1004). When an access request command such as a read request or a write request was issued from the host computer 100 to the diskarray system, the diskarray controller 200 receives the access request command and identifies one of the disk devices having data to be accessed by the RAID control program 210. And the disk command issuance program 220 issues an I/O type command to the identified disk device. Accordingly, the access monitoring program 261 monitors whether or not the disk command issuance program 220 issued the I/O type command to the disk I/F 206.

When there is no access to the disk device 501 based on a request from the host computer 100, control proceeds to a step 1006. When there is an access to the disk device 501 based on a request from the host computer 100, the access monitoring program 261 clears the timer to zero (step 1005) and proceeds to the step 1006.

In the step 1006, the access monitoring program 261 determines whether or not the value of the timer which started the measurement in the step 1003 reached the nonaccess time threshold set in the nonaccess-time threshold setting area 270 (step 1006). When the timer value fails to reach the non-access time threshold, control returns to the step 1004.

When the timer value reached the non-access time threshold, the online check program 263 stops the online data check (step 1007), and the unload control program 262 issues an unload enable command to the disk device 501 to put the head 460 in the unload state (step 1008).

The access monitoring program 261 monitors the issuance of a command from the disk command issuance program 220 to the disk I/F 206 and the presence or absence of an access to the disk device 501 based on a request from the host computer 100 (step 1009). In the absence of an access to the disk device 501 based on a request of the host computer 100, the step 1009 is repeated.

In the presence of an access to the disk device 501 based on a request of the host computer 100, control returns to the step 1001. When the head 460 of the disk device 501 is put in the unload state and an access to the disk device 501 occurs based on a request from the host computer 100, the unload control program 262 issues an unload disable command to put the head 460 of the disk device 501 in the load state (step 1001). The subsequent processing is as follows.

In this case, it is assumed in the step 1004 that the disk access to the disk device 501 is executed according to the request of the host computer 100. However, the present invention is not limited to the disk access executed according to the request of the host computer 100, and the access monitoring program 261 can be arranged to monitor various types of commands which are issued from the disk command issuance program 220 to cause access to the media 450 via the head 460.

Explanation has been made as to the processing flow of unload supporting operations.

(4) Unload Monitoring Operation

The disk operating-time measurement program 250 counts a cumulative operating time of the disk devices 501 to 504 at constant intervals and sets the cumulative value in the "cumulative operating time" of the disk management table 240.

Figure 4:
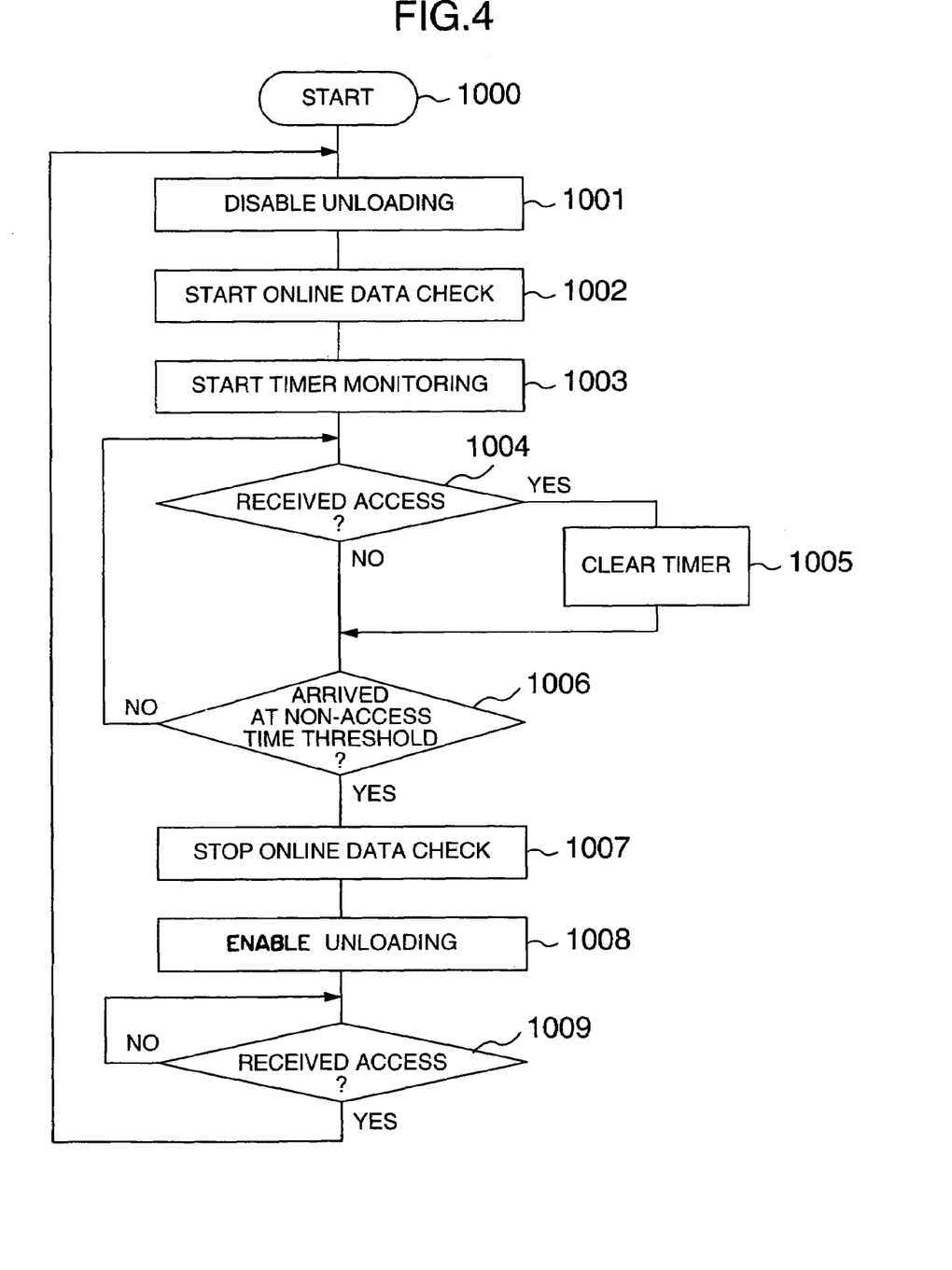
FIG. 4 shows an example of a processing flow of unload supporting operations.

The disk operating-time measurement program 250 also counts a time lapse from the step 1008 to the step 1001 in FIG. 4, and sets it in the "cumulative unload time" of the disk management table 240 as a cumulative time during which the head 460 is put in the unload state.

The disk operating-time measurement program 250 further sets an operating time and an unload time in a specific duration in the "differential operating time" and the "differential unload time" of the disk management table 240 respectively. In this connection, the 'specific duration' is received from the management console 700 of the user or administrator via the input unit 710 and set in the diskarray controller 200 via the management I/F 207.

Figure 5:
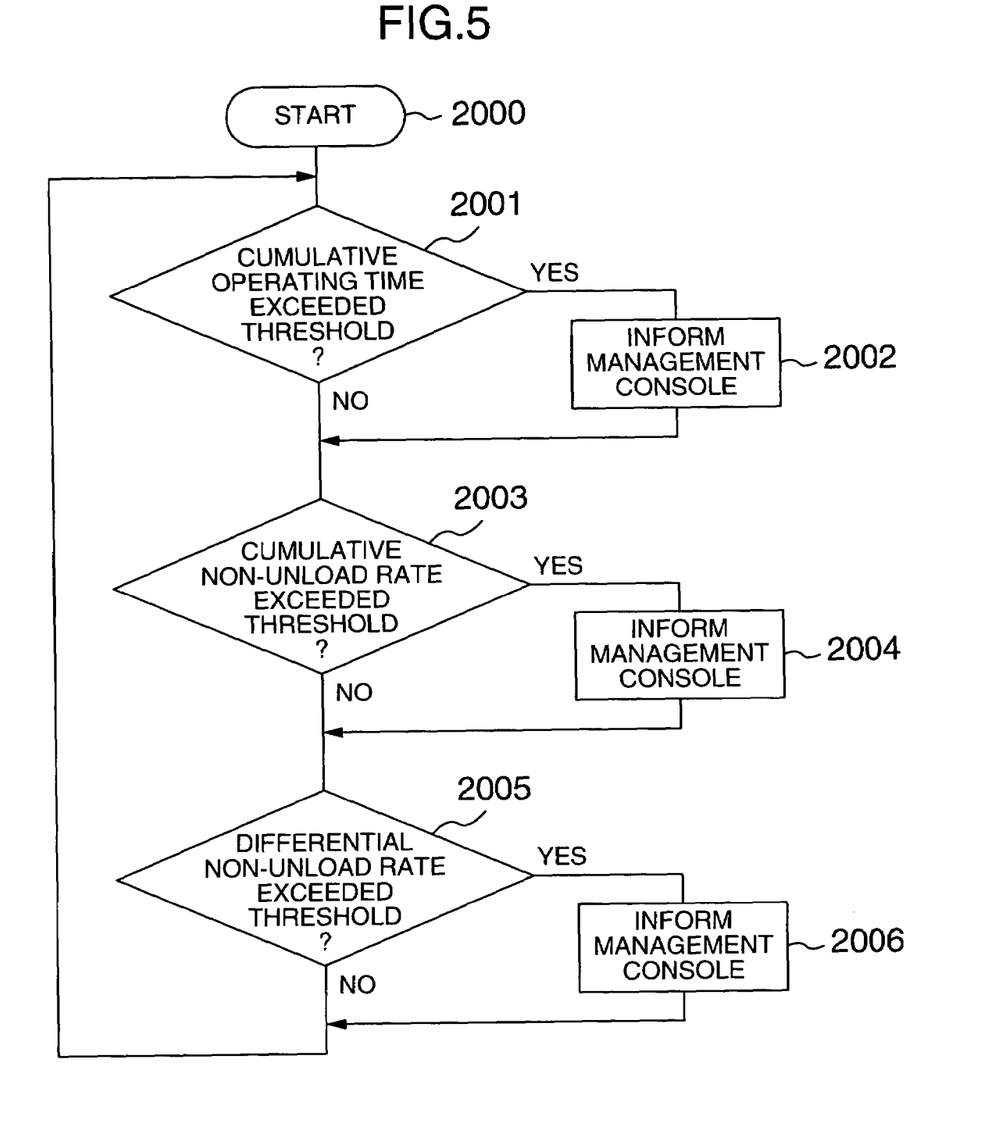
FIG. 5 shows an example of a processing flow of unload monitoring operations.

FIG. 5 shows an example of a processing flow of unload monitoring operations based on the disk operating-time determination program 255.

The disk operating-time determination program 255 decides whether or not the "cumulative operating time" of the disk management table 240 exceeded the "cumulative operating time threshold" (step 2001). When the "cumulative operating time threshold" exceeded the "cumulative operating time threshold", the disk operating-time determination program 255 informs the management console 700 of the fact that the "cumulative operating time" exceeded its threshold using the disk information notification program 260 (step 2002), and control proceeds to a step 2003. When the "cumulative operating time" fails to exceed its threshold, control goes to the step 2003.

Next, the disk operating-time determination program 255 determines whether or not a cumulative non-unload rate exceeded the "cumulative non-unload rate threshold" of the disk management table 240 (step 2003). When the cumulative non-unload rate exceeded its threshold, the disk operating-time determination program 255 informs the management console 700 of the fact that the cumulative non-unload rate exceeded its threshold using the disk information notification program 260 (step 2004), and then control proceeds to a step 2005. When the cumulative non-unload rate fails to exceed its threshold, control goes to the step 2005.

The disk operating-time determination program 255 then determines whether or not a differential non-unload rate exceeded the "differential non-unload rate threshold" of the disk management table 240 (step 2005). When the differential non-unload rate exceeded its threshold, the disk operating-time determination program 255 informs the management console 700 of the fact that the differential non-unload rate exceeded its threshold using the disk information notification program 260 (step 2006) and then control returns to the step 2001. When the differential non-unload rate fails to exceed its threshold, control goes to the step 2001.

Explanation has been made as to the processing flow of unload monitoring operations. The management console 700, when receiving the notification from the disk information notification program 260, outputs the notified information to the output unit 720.

In this connection, the disk information notification program 260 is operated not only by the instruction of the disk operating-time determination program 255 but also by the instruction of the user or maintenance man who received the information via the management console. For example, when the user or maintenance man wants to acquire information in the disk management table 240 of the diskarray controller 200, he enters an acquisition request in the input unit 710 of the management console 700 to acquire the information. The disk information notification program 260 of the diskarray controller 200 accepts the information acquisition request via the input unit 710 and the management I/F 207, and informs the management console 700 of the information stored in the disk management table 240. The management console 700 outputs the informed information to the output unit 720.

In accordance with the embodiment explained above, since the head of the disk device is retracted to the unload position during the absence of any access to the diskarray system from the host computer 100, the contact between the media and head of the disk device can be suppressed and therefore the failure rate of the disk device can be reduced.

Further, when the head of the disk device is located at the unload position, the online data check is stopped. When the head is put in the load state, the online data check is executed. As a result, the online data check can be efficiently carried out and the reliability of the disk device can be increased. That is, since the unloading of the head and the online data check can be used combinedly, the reduction of the failure rate of the disk device caused by the head unloading, the detection of a faulty storage area by the online data check, as well as the restoration of data stored in the detected faulty storage area can improve the reliability of the disk device.

Even when the head of the disk device is retracted to the unload position, the rotation of the media can be maintained and thus degradation (prolonged response time) of a response performance to the host computer 100 can be suppressed.

In this connection, in place of the unload supporting operations shown in FIG. 4, the unload control program may alternately issue the unload disable command and the unload enable command to repeat the disabled and enabled unloading at intervals of a constant time. In this case, the "constant time" is desirably such a value as not to exceed a specification limit of the unload disable/enable repetitive frequency of the head in the disk life, and desirably such a value as settable in the diskarray system by the user or maintenance man via the input unit 710 of the management console. Even in this case, when the unload control program 262 issues the unload disable command, the disk management program 230 starts the execution of the online data check using the online check program 263 after the issuance of the unload disable command, and stops the execution of the online check program before the unload control program 262 issues the unload enable command. As a result, the adherence to the limitation specification of disk start/stop repetition and thus the adherence to the limitation specification of head unload disable/enable repetition can be attained.

Further, the system may be arranged so that the user selects the execution of the unload supporting operations shown in FIG. 4 (choice (A)) or the repetition of the unload disabling/enabling operation at intervals of a constant time by the unload control program (choice (B)). In this case, the user selects the above choice (A) or (B) for the control of the unload enable/disable on the displayed selection screen of the output unit 720 of the management console 700, and enters his selected result from the input unit 710. The entry from the user is input to the diskarray controller 200 via the management I/F 207, so that, according to the entry from the user, the CPU 201 selects and executes any of the above choice methods (A) and (B). Further, not only the above choices (A) and (B) but also another choice (C) of putting the head always in the load state while not putting the head in the unload state is prepared. In this case, in a manner similar to the above, the user may select any of the above choices (A), (B) and (C) and enter his selected choice from the input unit 710 of the management console 700. When the choice (C) is selected, the diskarray controller 200 performs no head unload enabling operation.

In the foregoing embodiment, explanation has been made in connection with the ATA disk as an example of the disk device. From the viewpoint of increasing the reliability of the disk device, however, a disk device other than the ATA type, for example, not only a disk device having a reliability higher than the ATA disk but also an FC (fiber channel) disk having a reliability higher than the ATA type can be employed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A diskarray system storing data accessed from a computer, comprising:
   a diskarray controller; and
   plural disks each adapted to store data;
   wherein each of said plural disks comprises a media adapted to record data thereon, a head adapted to read or write data from or to the media, and a head position controller adapted to control a position of the head,
   wherein said diskarray controller is adapted to perform online data check operations on the plural disks to check whether or not a failure is present in storage areas of the disks by reading data from the storage areas of the disks,
   wherein said diskarray controller stops the online data check operations over the disks at a first predetermined timing,
   wherein said diskarray controller is adapted to issue an unload enable command to the disks so as to move the heads, in response to the stopping of the online data check operation, of the disks to positions different from positions at which the heads read or write data from or to the media,
   wherein said head position controller of the disks are adapted to move the position of said heads on the basis of said unload enable command,
   wherein said diskarray controller is further adapted to issue an unload disable command to the disks at a second predetermined timing so as to move the heads of the disks to positions where the heads can read or write data from or to the media, and said diskarray controller, after said heads are moved thereto, is adapted to perform the online data check operations over said disks,
   wherein said first predetermined timing is when a predetermined time elapses after the diskarray system lastly receives an access request to the data stored in said disks from the computer, and
   wherein said second predetermined timing is when the diskarray system firstly receives an access request to data stored in said disks from the computer after the diskarray system stops the online data check operation over the disks.

2. A diskarray system according to claim 1, wherein said diskarray controller is adapted to repetitively issue the unload disable command and an unload enable command at intervals of a predetermined time.

3. A diskarray system according to claim 1, wherein said plurality of disks are of an ATA type.

4. A diskarray system according to claim 1, wherein said diskarray controller has a management interface which outputs information to a management console,
   wherein said diskarray controller is adapted to measure an operating time of each of said plurality of disks and, when the operating time exceeds a predetermined threshold, informs said management console of the fact that the operating time exceeded the threshold via said management interface.

5. A diskarray system according to claim 1, wherein said diskarray controller has a management interface which outputs information to a management console,
   wherein said diskarray controller is adapted to measure a cumulative time during which the heads are at the positions where the heads can read or write data from or to the media with respect to each of said plurality of disks, and output measured results to said management console via said management interface.

6. A diskarray system according to claim 5, wherein said diskarray controller is adapted to measure a time during which the heads are at the positions where the heads can read or write data from or to the media with respect to each of said plurality of disks, and output measured results to said management console via said interface.

7. A diskarray system according to claim 1, wherein the online data check operations are a parity-check operations in which a plurality of pieces of data forming a parity group are read from said disks in a diskarray to check whether or not parity data of said read data have consistency as said parity group of the diskarray.

8. A diskarray system according to claim 1, wherein said diskarray controller is adapted to measure a time elapsed after the disarray controller lastly receives the access request to the data stored in said disks from the computer, and decides said first predetermined timing on the basis of the measurement.

9. A diskarray system according to claim 1, wherein, in response to receipt of the unload enable command, the head position controller in each of the plural disks moves the head position to an unload position asynchronously with the timing when the unload enable command is received.

* * * * *